United States Patent [19]
Smith

[11] 3,923,835
[45] Dec. 2, 1975

[54] PROCESS FOR MAKING 4-BUTYROLACTONE

[75] Inventor: William E. Smith, Schenectady, N.Y.

[73] Assignee: General Electric Company, Schenectady, N.Y.

[22] Filed: Apr. 29, 1974

[21] Appl. No.: 464,802

[52] U.S. Cl. ............................................. 260/343.6
[51] Int. Cl.² ........................................ C07D 307/32
[58] Field of Search .................................. 260/343.6

[56] References Cited
UNITED STATES PATENTS 3,317,563  5/1967  Horlenko et al................ 260/343.6

FOREIGN PATENTS OR APPLICATIONS 1,518,186  4/1969  Germany .......................... 260/343.6
1,076,660  3/1960  Germany .......................... 260/343.6

*Primary Examiner*—Anton H. Sutto
*Assistant Examiner*—Jane S. Myers
*Attorney, Agent, or Firm*—Joseph T. Cohen; Jerome C. Squillaro

[57] ABSTRACT

4-Butyrolactone can be made by reacting an acetate of butanediol with methanol in the vapor phase in the presence of a catalyst mixture comprising magnesia and a copper dehydrogenating agent.

7 Claims, No Drawings

PROCESS FOR MAKING 4-BUTYROLACTONE

This invention is concerned with a process for making 4-butyrolactone. More particularly, the invention relates to a process for making 4-butyrolactone which comprises reacting at elevated temperatures an acetate of butanediol with methanol in the vapor phase in the presence of a catalyst mixture comprising magnesia and a copper dehydrogenating agent.

4-Butyrolactone (also known as ν-butyrolactone) is a chemical compound which has wide utility as a solvent for various reactions, as a solvent for high polymers, and as a chemical and synthetic intermediate used to make nylon polymer which, as is well known, has utility in the apparel and insulation arts.

I have now discovered a relatively simple method for making the lactone from either the monoacetate of butanediol or the diacetate of butanediol by reacting the latter with methanol in the vapor phase at elevated temperatures employing a mixture of catalysts comprising magnesia and a copper dehydrogenating agent (for brevity hereinafter designated as "copper agent"). I have found that in addition to being able to start with butanediol mono- or diacetate, I can also start with a mixture of diol derivatives obtained by subjecting allyl acetate to the oxo process, namely, 4-acetoxybutanol, 3-acetoxy-2-methylpropanol, 2-acetoxybutanol, and their respective diol and diacetate disproportionation products, and still obtain good yields of the 4-butyrolactone. Such reactions are more particularly disclosed and claimed in my copending application Ser. No. 365,228, filed May 30, 1973, and assigned to the same assignee as the present invention. By reference, this application is made part of the disclosures of the instant application. This is due to the fact that in my process, the derivatives of 3-acetoxy-2-methylpropane and 2-acetoxybutanol are converted to low boiling compounds which are readily removed to permit rapid and almost complete isolation of 4-butyrolactone.

It is important that the methanol be employed with the butanediol acetate (which term is intended to include both the monoacetate and the diacetate of butanediol). It is believed that a dehydrogenation reaction goes on simultaneously with a reaction between the butanediol acetate and the methanol. These reactions are believed to be interrelated and dependent upon each other. Thus, the hydrogenation reaction serves to drive the overall process to completion with good yields of the 4-butyrolactone. In addition, the use of methanol, rather than the use of water with the butanediol acetate, is essential in order to avoid producing any acidic by- or co-products. If a hydrolysis method were used, the acetic acid produced would cause tetrahydrofuran to form rather than 4-butyrolactone. In addition, the acid tends to destroy the catalyst mixture, namely, the magnesia and copper dehydrogenation catalyst. In my method, the methyl acetate that forms is neutral and is inert to the catalyst or to any co-product. In addition, the use of the methanol serves as a moderating agent for the reaction and at the same time, seems to have an activating influence on the catalyst mixture.

The process whereby the monoacetate or the diacetate of the butanediol can be reacted with the methanol in the presence of the mixed catalyst system is best illustrated by the following two equations using copper chromite as an example of a copper dehydrogenation catalyst:

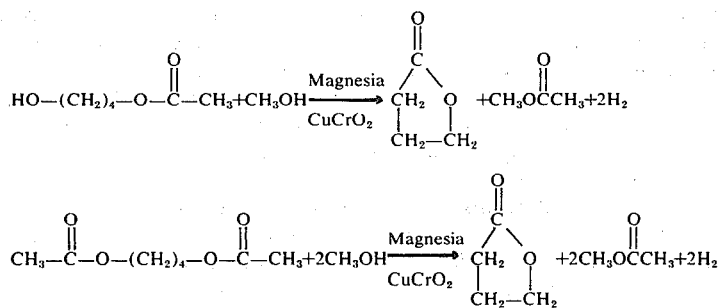

The catalysts that may be employed in the invention are magnesia in its various forms including magnesium oxide, and magnesium oxide mixed with magnesium hydroxide. Magnesia compositions of the type described in U.S. Pat. No. 3,748,282 are particularly active in promoting the conversion of the butanediol acetate to the 4-butyrolactone. These catalysts are composed of magnesium oxide, magnesium hydroxide, and manganese oxide promoter. This patent is incorporated herein by reference.

The copper dehydrogenating agent, which term is intended to include copper itself, can be any copper compound which can be activated under the influence of hydrogen and is capable of removing hydrogen from organic compounds. The copper salts capable of accomplishing this are numerous and well-known in the art. Examples of such copper catalysts which may be used are, for instance, copper chromite, cupric nitrate, cuprous nitrate, copper sulfate, cuprous chloride, cupric chloride, etc. Generally, the copper dehydrogenating agent should be one which is capable of being reduced in the presence of hydrogen to the nascent form of metallic copper. The copper dehydrogenating agent used should be one which does not adversely affect the reaction or any of the reactants or by-products.

The amount of magnesia and copper dehydrogenating catalyst employed can be varied widely and is not critical. Since this is a vapor phase reaction, it is generally desirable to form a mixture of the magnesia and the copper dehydrogenating catalyst and position them in the reaction tube. If desired, employing suitable means, the magnesia or the copper dehydrogenating catalyst may be deposited on inert carriers such as finely divided carbon, finely divided graphite, etc. Generally, on a weight basis, one can employ from about 0.5 to 5 parts or more of the copper dehydrogenating agent per part of the magnesia catalyst. Little difficulty should be encountered in determining the amounts of the magnesia and copper dehydrogenating agent employed in the reaction zone over which the mixture of the methanol and the butanediol acetate is passed.

The temperatures at which the process can be carried out can vary widely. Generally, elevated temperatures are required since it is a vapor phase reaction. I have found that temperatures ranging from about 150° to 300°C. are generally adequate, and preferably the reaction is carried out at a temperature of from about 175° to 250°C. The maximum temperature should be below the temperature at which destruction or decomposition of the reactants or their products occurs.

In addition to atmospheric pressure, as is normally employed, it will be apparent to those skilled in the art that superatmospheric or even subatmospheric pressures may be employed where conditions warrant.

The means for carrying out the reaction to form the butyrolactone may be varied widely. Since this is a vapor phase reaction, it is essential that one employ a hot tube reactor adequately supplied with heating means. Generally, the catalyst mixture is packed in the tube, using a catalyst support if desired. Thereafter, applying heat and using a slow hydrogen stream through the reaction tube (which is used for increasing the activity of the catalyst mixture), the mixture of the butanediol acetate and the methanol are introduced and allowed to course through the tube over the heated bed of the catalyst mixture for a sufficient time (residence times on the order of about 3 to 10 seconds are usually satisfactory). The effluent materials are then removed from the exit end of the tube and condensed. The butyrolactone obtained can be isolated in essentially pure form. The unreacted materials can be recycled to the reaction zone on a continuous basis. Removal of the methyl acetate at the top of the reactor aids in driving the reaction in the direction of butyrolactone formation.

In order that those skilled in the art may better understand how the present invention may be practiced, the following examples are given by way of illustration and not by way of limitation.

The apparatus employed in the following examples comprised a vertical hot tube reactor (16 mm ID × 70 cm effective length) constructed from heavy wall glass, with 24/40 male and female joints. Vigreaux points were indented just above the male joint to support catalyst pellets. Thermocouple leads were fastened into three other Vigreaux indentations at points along the length. Three 4 ft. × 1 in. glass insulating heating tapes were wound around the tube, covered with glass wool and glass tape, and connected to separate variable transformers. The tube exit was connected by a gooseneck (also heated) to a condenser and collection vessel. A three-necked flask served as the evaporator with the reactants added from an addition funnel in a side neck.

EXAMPLE 1

The tube described above was charged with a mixed catalyst composed of 132 grams of copper chromite (Harshaw Cu-0203 T, ⅛" pellets) and 58 grams of magnesia catalyst in the form of 3/16" pellets containing 54% magnesium oxide, 42% magnesium hydroxide, and 4% manganese oxide. The system was then heated at 190°–200°C. while passing a slow hydrogen stream through the tube. Simultaneously, a mixture of 50 grams butanediol diacetate and 150 grams methanol was introduced over a two-hour period so that there was a residence time of the mixture of organic materials in the tube of about 3 to 10 seconds. A direct quantitative glpc (gas-liquid partition chromatography) analysis (diphenylmethane internal standard) of the condensed effluent showed the presence of 5.8 grams of 1,4-butanediol diacetate (12% unconverted), 2.4 grams of 4-acetoxybutanol (6% yield, 6% unconverted), 16 grams of 4-butyrolactone (78% yield based on 82% conversion), and 27.7 grams of methyl acetate (77% yield based on 85% conversion of available acetate).

EXAMPLE 2

When crude monoacetate of butanediol comprising the product obtained by subjecting allyl acetate to the oxo process (containing in addition small amounts of 3-acetoxy-2-methyl propane, 2-acetoxybutanol, their corresponding diacetates, and 1,4-butanediol diacetate) was reacted with methanol in the same way as was done in Example 1, the conversion and yield of 4-butyrolactone was qualitatively and quantitatively almost the same as when the butanediol diacetate was employed.

It should be noted that when methanol was reacted with the butanediol diacetate in the presence of the copper chromite alone, a relatively low conversion (about 20%) of the butanediol diacetate was obtained even at the more elevated temperature of 250°C. This illustrates the importance of having the combined catalyst mixture of the magnesia and the copper dehydrogenation agent.

EXAMPLE 3

Employing the same tube reactor and conditions as described in Example 1, the tube was charged with 156 grams of catalyst prepared by impregnating ⅛" pellets of magnesium oxide with 8%, by weight, thereof of cupric nitrate. The catalyst bed mixture was heated at about 180° to 200°C. under a hydrogen stream and while the hydrogen was continually passed through, a mixture of 50 grams of 1,4-butanediol diacetate and 150 grams of methanol was introduced into the tube over 2 hours, so that the mixture of the reactant as it passed through the tube had a residence time of about 3 to 10 seconds. Analysis of the effluent gas by glpc showed that as a result of a single pass, 20% of the starting material was converted to the 4-butyrolactone. Another 30% of the diacetate had been converted to the butanediol monoacetate, while the balance of the effluent was methanol and unchanged butanediol diacetate. The corresponding amount of methyl acetate was also found. It will be apparent that a recycle of the unreacted materials and the butanediol acetate to the reaction zone would additionally convert the reactants to the desired 4-butyrolactone.

It will of course be apparent to those skilled in the art that in addition to the magnesia catalysts employed above, other magnesia type catalysts, many examples of which are given in the above-identified U.S. Pat. No. 3,748,282 may be employed without departing from the scope of the invention. The conditions of reaction and the manner of introduction of the reactants can also be varied within wide limits.

What I claim as new and desire to secure by Letters Patent:

1. The process for making 4-butyrolactone which comprises reacting, in the presence of hydrogen at a temperature in excess of 150°C., an acetate of butanediol with methanol in the vapor phase in the presence of a catalyst mixture consisting essentially of magnesia and a copper dehydrogenating catalyst.

2. The process as in claim 1 wherein the magnesia catalyst is a mixture of magnesium oxide, magnesium hydroxide and manganese oxide.

3. The process as in claim 1 wherein the butanediol ester is the monoacetate of butanediol.

4. The process as in claim 1 wherein the butanediol ester is the diacetate of butanediol.

5. A process for preparing 4-butyrolactone which comprises heating in the vapor phase at a temperature above 150°C. in the presence of hydrogen, a mixture comprising a butanediol acetate and methanol in the presence of a catalytic mixture consisting essentially of (1) a mixture of magnesium oxide and magnesium hydroxide, and (2) copper chromite.

6. The process as in claim 1 wherein the copper dehydrogenating agent is copper nitrate.

7. The process as in claim 1 wherein the copper dehydrogenating agent is copper chromite.

* * * * *